United States Patent
Yang

(10) Patent No.: US 6,692,852 B2
(45) Date of Patent: Feb. 17, 2004

(54) GENERATING SYSTEM FOR A FUEL CELL, AND HEAT WASTE RECIRCULATING AND COOLING SYSTEM OF SAID GENERATING SYSTEM

(75) Inventor: Jefferson YS Yang, Orange, CA (US)

(73) Assignee: Asia Pacific Fuel Cell Technologies, Ltd., Miaoli (TW)

( * ) Notice: Subject to any disclaimer, the term of this patent is extended or adjusted under 35 U.S.C. 154(b) by 243 days.

(21) Appl. No.: 09/939,194

(22) Filed: Aug. 24, 2001

(65) Prior Publication Data

US 2002/0150803 A1 Oct. 17, 2002

(30) Foreign Application Priority Data

Apr. 16, 2001 (TW) .................................. 90109034 A

(51) Int. Cl.$^7$ ................................................ H01M 8/18
(52) U.S. Cl. ............................ 429/20; 429/26; 429/19; 429/24; 429/25; 429/22
(58) Field of Search .................... 429/12, 13, 17, 429/26, 24, 25, 19, 20, 22

(56) References Cited

U.S. PATENT DOCUMENTS

| | | |
|---|---|---|
| 4,619,589 A | 10/1986 | Mueller et al. |
| 4,966,528 A | 10/1990 | Henkel et al. |
| 5,246,351 A | 9/1993 | Horn et al. |
| 5,635,039 A * | 6/1997 | Cisar et al. ............... 204/252 |
| 5,798,186 A | 8/1998 | Fletcher et al. |
| 6,149,810 A * | 11/2000 | Gonzalez-Martin et al. ..... 210/321.84 |
| 6,265,093 B1 * | 7/2001 | Surampudi et al. ........... 429/13 |
| 6,360,835 B1 * | 3/2002 | Skala ........................ 180/65.2 |
| 6,436,562 B1 * | 8/2002 | DuBose ...................... 429/13 |
| 6,447,945 B1 * | 9/2002 | Streckert et al. ............ 429/34 |
| 6,569,298 B2 * | 5/2003 | Merida-Donis ............. 204/263 |

FOREIGN PATENT DOCUMENTS

EP  0 741 428 A1  4/1995

OTHER PUBLICATIONS

European Search Report for EP 02 01 4823 dated Feb. 13, 2003, 3 pages, European Patent Office.

* cited by examiner

Primary Examiner—Bruce F. Bell
(74) Attorney, Agent, or Firm—Rosenberg, Klein & Lee

(57) ABSTRACT

This invention is related to a generating system for a fuel cell, and heat waste recirculating and cooling system of said generating system, comprising: a water tank for temporarily storing hot water generated by the fuel cell, a heat exchanger in thermal conductive communication with an anode gas supply, and a pump for pumping the hot water to the heat exchanger, whereby heat energy of the hot water is used to heat the anode gas supply for releasing anode gas, wherein water upon releasing the heat energy is transported back to the fuel cell to reduce the temperature of the fuel cell, thereby forming a heat waste recirculation.

8 Claims, 3 Drawing Sheets

GENERATING SYSTEM FOR A FUEL CELL, AND HEAT WASTE RECIRCULATING AND COOLING SYSTEM OF SAID GENERATING SYSTEM

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

This invention is related to a generating system for a fuel cell, in particular to a heat waste recirculating system within a generating system used in a proton exchange member fuel cell. The recirculating system effectively utilizes heat waste generated from a conventional fuel cell for reducing electrical energy that may be required by the fuel cell, and enhancing the generating efficiency of the entire system.

2. Description of the Related Art

With the rapid growth of human civilization the consumption of traditional energy sources, such as coal, oil and natural gas, increases rapidly. This results in serious pollution to the global environment and causes various environmental problems such as global warming and acid rain. It is now recognized that the existing natural energy resources are limited. Therefore, if the present rate of energy consumption continues, all existing natural energy sources will be exhausted in the near future. Accordingly, many developed countries are dedicated to the research and development of new and alternative energy sources. The fuel cell is one of the most important and reasonably priced energy sources. Compared with traditional internal combustion engines, the fuel cell has many advantages such as high-energy conversion efficiency, clean exhaust, low noise, and no consumption of traditional gasoline.

In brief, a fuel cell is an electrical power generation device powered by the electrochemical reaction of hydrogen and oxygen. Basically, the reaction is an electrochemical reaction of the electrolysis of water, to convert the chemical energy into electrical energy. The basic structure of a fuel cell, for example, a proton exchange membrane fuel cell, comprises a plurality of cell units. Each cell unit comprises a proton exchange membrane (PEM) at the middle, with the two sides thereof provided with a layer of catalyst, each of the two outsides of the catalyst is further provided with a gas diffusion layer (GDL). An anode plate and a cathode plate are further provided at the outermost sides adjacent to the GDL. After combining all the above elements together, a cell unit is formed. For the practical application of a fuel cell, a plurality of the above cell units are stacked and serially connected to provide sufficient power, as illustrated. Therefore, two adjacent cell units can share a common polar plate, which serves as the anode and the cathode for the two adjacent cell units respectively. Accordingly, such a polar plate is usually referred to as a bipolar plate. Generally, the two sides of the bipolar plate are provided with many grooves for transporting the gases for reaction, such as hydrogen and air (to provide oxygen), as well as transporting the reactants, such as water droplets or vapor, out of the bipolar plate.

One gas supply system for use in a fuel cell comprises: a cathode gas supply system (such as an oxygen supply), and an anode circulation system (such as a hydrogen circulation system), as illustrated in FIG. 1. Atmospheric air may serve as a supply of the oxygen supply system 30, where air is filtered by a filter 32 and than pumped into the fuel cell 50 through a blower 34. Excessive air, upon reaction within the fuel cell 50, is discharged into a water recuperator 36. The water recuperator 36 may recuperate the minute amount of water contained within the discharged air, where the water is then discharged with the hot water, a reactant of the fuel cell 50. Part of the hot water flows through a radiator and then re-enters the fuel cell 50 to construct a cooling system to reduce the heat generated by the fuel cell 50.

The anode circulation system includes: a hydrogen source 40 which regulates hydrogen input through a pressure regulator 42; a hydrogen pump 44 being provided at another end of the fuel cell 50 for discharging excessive hydrogen, upon reaction within the fuel cell, and for pumping the hydrogen source 40 into the fuel cell 50. The excessive hydrogen is discharged through a humidifier 46, then flows back into the piping of the hydrogen supply to be mixed with fresh hydrogen, and then repeats the same circulation.

One known device for storing the anode gas (hydrogen) is to adopt a hydrogen container filled with pressurized hydrogen. An external valve and a hydrogen pump 44 then cooperate to discharge hydrogen that is supplied to the anode gas circulation system. However, such a design for releasing hydrogen, usually, cannot ensure that the hydrogen will be supplied at a constant pressure and in a constant flow rate thereby resulting in waste and reducing generation efficiency.

A steady hydrogen supply system capable of supplying hydrogen at a constant pressure and constant amount, without requiring additional components, is thus needed.

BRIEF SUMMARY OF THE INVENTION

The major technical content of this invention is to use the so-called metal hydride that is filled in the anode gas supply. Metal hydride is able to discharge hydrogen at a pressure corresponding to the temperature that it experiences; the process of releasing hydrogen is an endothermic reaction. When the hydrogen stored within the metal hydride has been completely exhausted, pure hydrogen can be re-charged back to the metal hydride; the process of charging hydrogen is an exothermic reaction. The temperature of metal hydride experiences is positively proportional to the pressure of the hydrogen. Such a proportional relationship may vary among metal hydride furnished by different suppliers. Therefore, while using an anode gas supply of this type, heat energy must be furnished to the anode gas supply in order to discharge the anode gas required by the electrochemical reaction.

In other words, this invention uses the heat waste generated by the fuel cell, as the heat source required by the metal hydride. That is, hot water, a bi-product of the electrochemical reaction of the fuel cell, is used to discharge the anode gas of the anode gas supply. After the hot water is cooled, the coolant is then transported back to the fuel cell to reduce the temperature of the fuel cell, thereby forming a waste-heat recirculation. Such a configuration does not change the basic construction of the original cooling system, but does provide a steady heat source required by the anode gas supply.

It is, thus, a primary objective of this invention to use the thermal, a bi-product of the electrochemical reaction of the fuel cell, as the heat energy for releasing the anode gas of the anode gas supply, thereby constructing a self-sufficient heat energy supply system, reducing manufacturing cost, eliminating the use of electrical power consumed by the fuel cell, and enhancing the efficiency of the entire system.

It is a further objective of this invention to join the self-sufficient heat energy supply system to the cooling system of the fuel cell, so as to effectively implement metal hydride technology in constructing a heat waste recirculation and cooling system that does not lose any heat energy and that does not require additional equipment.

The structures and characteristics of this invention can be realized by referring to the appended drawings and explanations of the preferred embodiments.

DETAILED DESCRIPTION OF THE INVENTION

Figure 1:
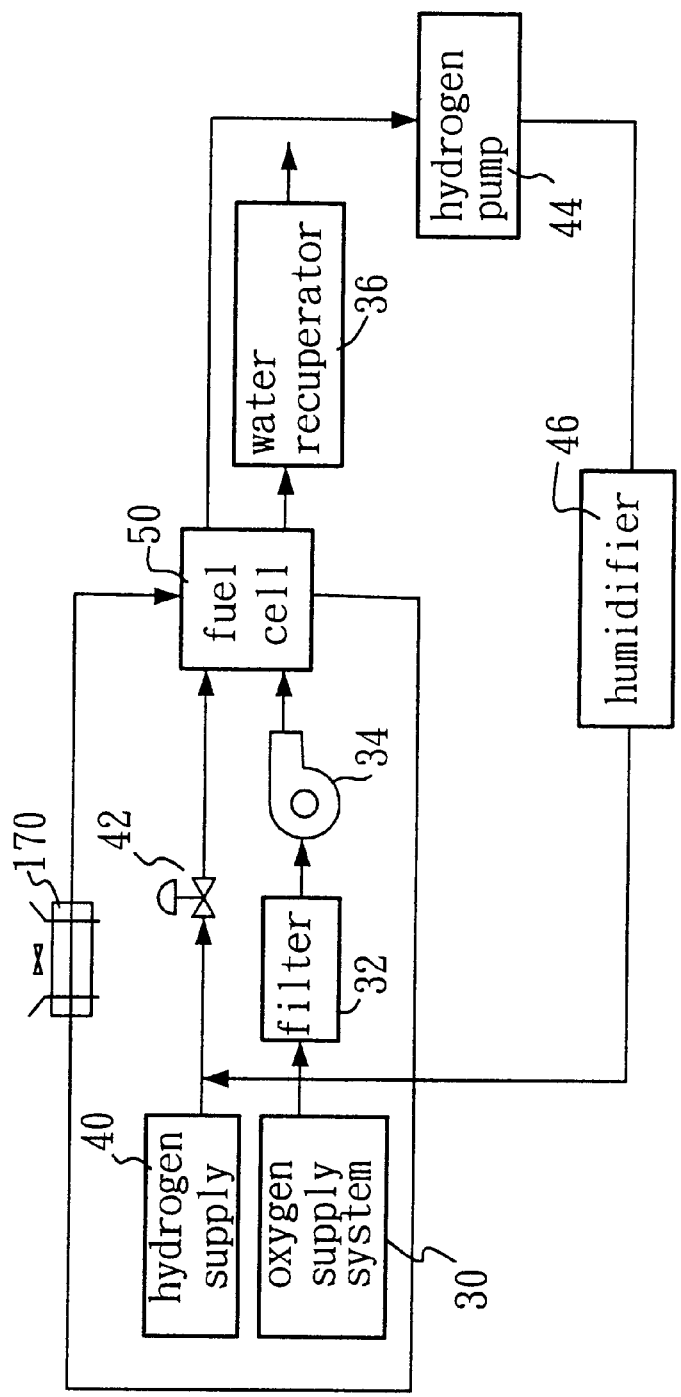
FIG. 1 is a schematic view showing a gas supply of a conventional fuel cell.
Figure 2:
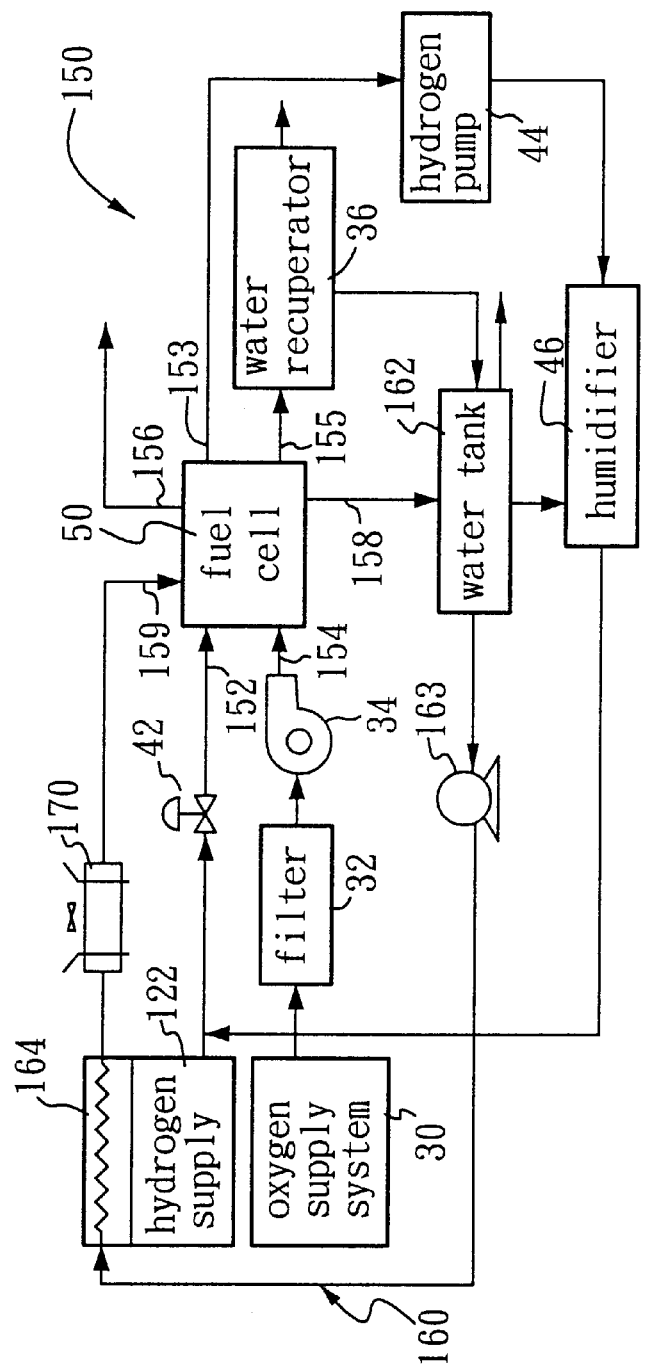
FIG. 2 is a schematic view showing a fuel cell comprising a preferred embodiment of a heat waste recirculation and cooling system of this invention.

As illustrated in FIG. 2, the heat waste recirculating and cooling system 160 is mainly for use with a fuel cell generating system (fuel cell) 150 using metal hydride as an anode gas (hydrogen) supply 122. The fuel cell generating system 150 comprises: a fuel cell 50 having an anode gas inlet 152 connected to a hydrogen supply 122; a cathode gas inlet connected to the atmospheric air; an electrical power outlet 156, a heat waste inlet 154, and a coolant inlet 159. The heat waste recirculation and cooling system 160 includes: a water tank 162 connected to the heat waste outlet 158, for using heat waste generated by the fuel cell 150 after reaction to heat the water within the water tank 162; a heat exchanger 164 covering and in thermal connective communication with the anode gas supply (hydrogen supply) 122; and a pump 163 provided between the heat tank 162 and the heat exchanger 164 for pumping the hot water to the heat exchanger 164, whereby heat energy of the hot water is used to heat the metal hydride within the anode gas supply 122 for releasing anode gas at a constant pressure, wherein water upon releasing the heat energy is transported back to the fuel cell 50 to reduce the temperature of the fuel cell 50, thereby maintaining the fuel cell 50 at a lower operative temperature for an effective reaction.

According to an embodiment of this invention, excessive air, upon reaction within the fuel cell 150, is discharged into a water recuperator 36 through a cathode gas outlet 155. The water recuperator 36 may recuperate a minute amount of water contained within the discharged air, where the water is then guided to the water tank 162. Excessive hydrogen, upon reaction within the fuel cell 150, is pumped by a hydrogen pump 44 to a humidifier 46 through an anode gas outlet 163 to humidify the excessive hydrogen. The de-humidified, excessive hydrogen then flows back into the piping of the hydrogen supply to be mixed with fresh hydrogen, and then repeats the same circulation.

Figure 3:
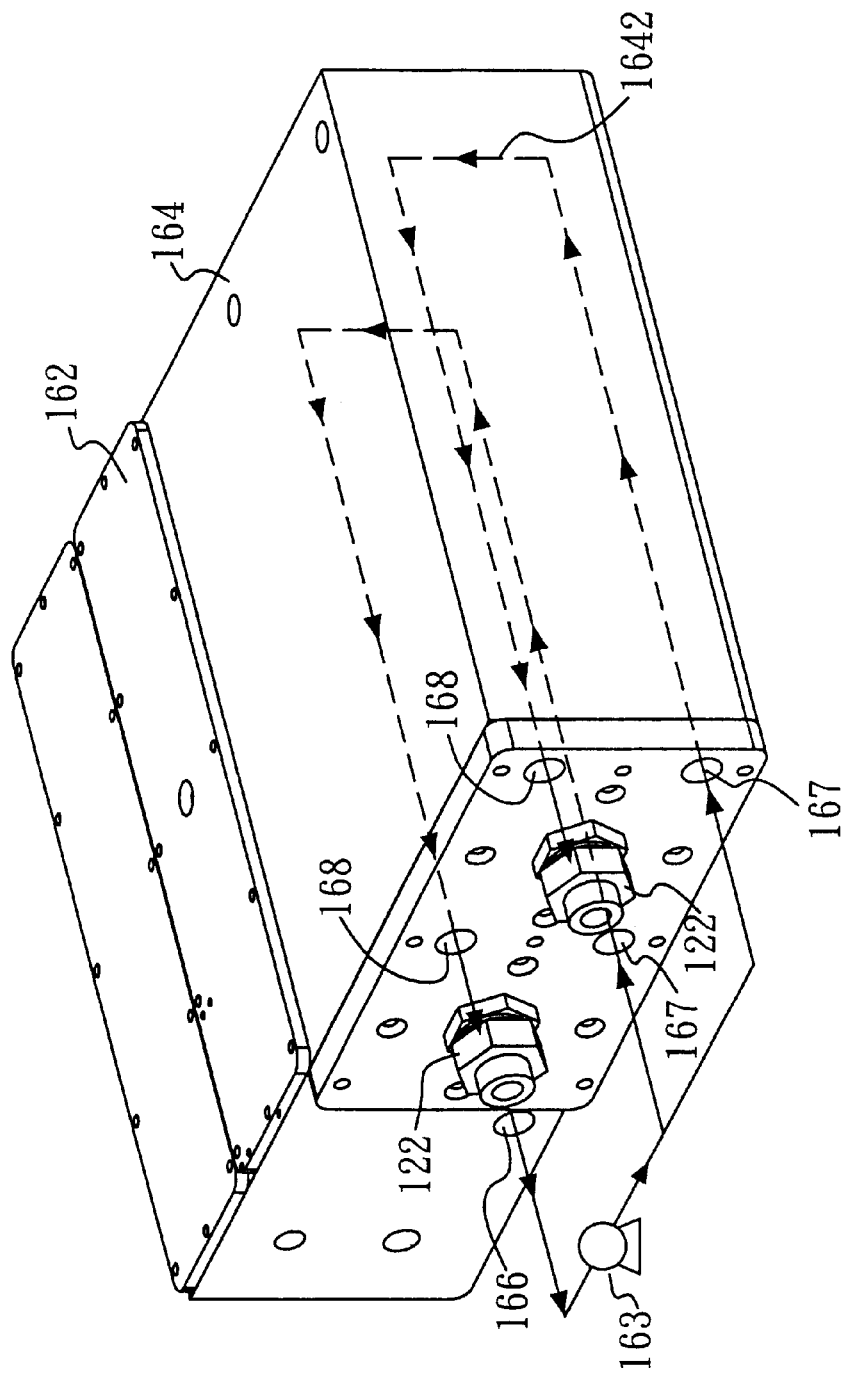
FIG. 3 illustrates a heat exchanger and water tank for use in this invention.

FIG. 3 illustrates a heat exchanger 164 and a water tank 162 for use in this invention. In this embodiment, the heater exchanger 164 includes: a plurality of water routes 1642 flowing around the hydrogen supply 122, the water routes 1642 being in fluid communication with the water tank 162 such that the hot water may flow around the hydrogen supply 122 through the water routes 1642.

As illustrated in FIG. 3, the hot water exits the water tank 162 from a water outlet 166 located at a lower end of the water tank 162, and is then pumped into the water routes 1642 through a plurality of water inlets 167 formed at a lower end of the heat exchanger 164, and then exits the water routes 164 through a plurality of water outlets 168 located at a lower end of the plate 128. By flowing the hot water around the hydrogen supply 122, heat energy of the hot water is conducted to the hydrogen supply 122.

As stated previously, the process of releasing hydrogen from the hydrogen supply 122 is an endothermic reaction. Hence, the heat energy of the hot water properly serves the purpose required for the endothermic reaction, such that the metal hydride within the hydrogen supply may discharge hydrogen at a selected temperature and at a corresponding pressure. One may implement an electronic control circuit, temperature sensors, or other conventional means to control the heating device, so as to maintain a pre-determined temperature.

A radiator 170 may further be provided between the heat exchanger 164 and the coolant inlet 159 of the fuel cell 150 for further reducing the temperature of the water leaving the heat exchanger 164 and transforming the hot water into coolant, to serve as cooling means for the fuel cell 159.

Further, in the preferred embodiment of this invention, part of the hot water, prior to entering the heater exchanger 164, may be guided to the humidifier 46 for humidifying excessive hydrogen, while part of the hot water may be guided to a deionized filtering device (not shown) to form a sub-circulation of purified water, thereby optimizing the entire cooling circulation without contaminating the fuel cell 50.

Therefore, while implementing the heat waste recirculation and cooling system 160 of this invention in a proton exchange member fuel cell, the heat waste generated from the fuel cell 50 is used to discharge hydrogen stored in the hydrogen supply, while transforming the hot water, a bi-product of the electrochemical reaction of the fuel cell, into coolant required by the fuel cell 50, thereby reducing component cost, reducing electrical energy that may be required by the fuel cell, generating system 150 and enhancing the generating efficiency of the entire system.

This invention is related to a novel creation that makes a breakthrough to conventional art. Aforementioned explanations, however, are directed to the description of preferred embodiments according to this invention. Various changes and implementations can be made by those skilled in the art without departing from the technical concept of this invention. Since this invention is not limited to the specific details described in connection with the preferred embodiments, changes to certain features of the preferred embodiments without altering the overall basic function of the invention are contemplated within the scope of the appended claims.

What is claimed is:

1. A generating system for a fuel cell, comprising:
   a fuel cell, having an anode gas inlet, an anode gas outlet, a cathode gas inlet, a cathode gas outlet, an electrical power outlet, a heat waste outlet, and a coolant inlet;
   an anode gas circulation system, crossing between the anode gas inlet and the anode gas outlet, and having an anode gas supply connected to the anode gas inlet;
   a cathode gas supply system, connected to the cathode gas inlet;

a heat waste recirculation and cooling system, crossing between the heat waste outlet and the coolant inlet, and having:
- a water tank, connected to the heat waste outlet that outputs hot water;
- a heat exchanger, in thermal conductive communication with the anode gas supply, the anode gas supply being controlled in temperature and pressure responsive thereto; and
- a pump, provided between the water tank and the heat exchanger.

2. The generating system for a fuel cell according to claim 1, wherein the heat exchanger includes a plurality of water routes surrounding the anode gas supply, the water routes being in fluid communication with the water tank, so as to enable the hot water to flow around the anode gas supply through the water routes.

3. The generating system for a fuel cell according to claim 1, wherein the anode gas supply is filled with metal hydride.

4. The generating system for a fuel cell according to claim 1, further comprising: a radiator provided between the heat exchanger and the coolant inlet of the fuel cell for facilitating temperature reduction of the water leaving the heat exchanger.

5. A heat waste recirculation and cooling system for use in a generating system for a fuel cell, comprising:
- a water tank, for connection to a heat waste outlet of the fuel cell that outputs hot water;
- a heat exchanger, in thermal conductive communication with an anode gas supply, the anode gas supply being controlled in temperature and pressure responsive thereto; and
- a pump, provided between the water tank and the heat exchanger.

6. The heat waste recirculation and cooling system according to claim 5, wherein the heat exchanger includes a plurality of water routes surrounding the anode gas supply, the water routes being in fluid communication with the water tank, so as to enable the hot water to flow around the anode gas supply through the water routes.

7. The heat waste recirculation and cooling system according to claim 5, wherein the anode gas supply is filled with metal hydride.

8. The heat waste recirculation and cooling system according to claim 5, further comprising: a radiator provided between the heat exchanger and the coolant inlet of the fuel cell for facilitating temperature reduction of the water leaving the heat exchanger.

* * * * *